Jan. 10, 1961    T. EDSTROM    2,967,926
TESTING PROCESS AND APPARATUS
Filed March 10, 1958
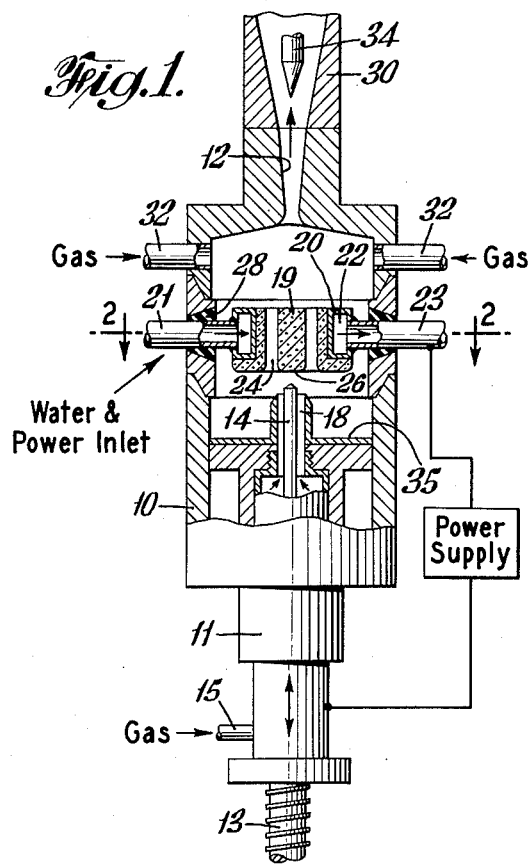
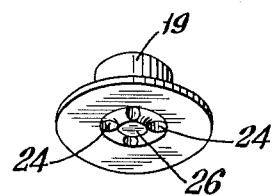
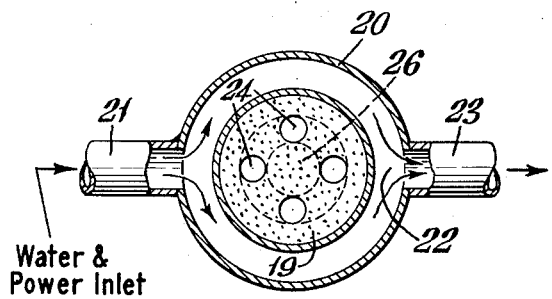
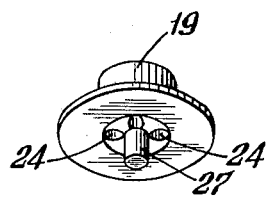
INVENTOR.
THEODORE EDSTROM
BY
ATTORNEY United States Patent Office 2,967,926
Patented Jan. 10, 1961

2,967,926

TESTING PROCESS AND APPARATUS

Theodore Edstrom, Parkview, Ohio, assignor to Union Carbide Corporation, a corporation of New York Filed Mar. 10, 1958, Ser. No. 720,219

9 Claims. (Cl. 219—75)

This invention relates to apparatus for producing high temperature, high velocity gas flow, and more particularly to a non-transferred electric arc gas heater.

It is desirable and is often essential to test various materials as to their oxidation resistance to air flow or their flow resistance to any gas at elevated temperatures. In some applications, as for instance re-entry of missiles into the atmosphere or high speed operation of aircraft, the amount and nature of the air resistance on, and air oxidation of components are of great importance and significance in ultimate design. It is a well known fact that most objects traveling at very high velocities oxidize very rapidly when put in contact with air and that this oxidation rate is increased by an increase in temperature.

In order to better understand and compensate for such oxidation and companion flow resistance problems, it has become very desirable to design and build testing apparatus which can produce gas flow at the desired elevated temperatures and high velocities. It has been found that electric arc heaters do an excellent job of raising the temperature of the surrounding medium to very high values. Heretofore, an electric arc of the transferred type was drawn through a vapor medium, usually water vapor, between an electrode and the article to be tested. Various problems have been encountered with such type of heater including the contamination of the gas heated by the plasma formed as the arc travels through the vapor.

Electric arc gas heaters have been tried using a cathode and a cylindrical copper anode, but it was found that the arc drawn between the cathode and the cylindrical copper anode was erratic with poor stability and further that the anode was quickly consumed by the tremendous heat generated. Graphite inserts were placed within the anode ring as a protective means but, even with the graphite insert, it was found that the arc was erratic and tended to deflect to one side and evaporate the graphite in one spot thus exposing the copper to the arc and rapid consumption.

It is an important object of this invention to provide an anode assembly which will withstand a high temperature arc without being rapidly consumed.

It is another object of this invention to provide apparatus which will produce relatively uncontaminated high temperature, high velocity gas flow.

The invention comprises an anode of graphite in the form of a central hub with spokes of graphite between the hub and an outer anode supporting ring, in combination with a cathode placed in a substantially cylindrical chamber having at least one gas inlet port thereto and a convergent-divergent nozzle exit therefrom. The gas entering through the inlet port performs several valuable functions. It acts as the medium which is heated and forced out the nozzle, it cools the chamber walls, it provides the internal pressure necessary for efficient operation of this apparatus and the atmosphere of the chamber is determined by the nature of the gas introduced. A direct current electric arc is maintained between the anode and the cathode which heats the gas in the chamber and forces it out the nozzle exit into a wind tunnel, and around the article to be tested, at very high velocity and temperature. The arc, being of the non-transferred type, is drawn between two electrodes distinct from and exclusive of the test article and the exit nozzle.

In the drawing:

Fig. 1 is a fragmentary view, in side elevation with parts broken away and shown in section, of apparatus illustrating this invention;

Fig. 2 is an enlarged cross-section taken along the line 2—2 of Fig. 1 looking in the direction of the arrows and showing the anode assembly;

Fig. 3 is an isometric view of the anode itself; and

Fig. 4 is an isometric view of a modification of the anode.

Referring to Fig. 1 of the drawings, the illustrated device comprises a substantially cylindrical chamber 10 having a piston 11, inserted at one end thereof, with a cathode 14 extending from the piston face 35. The piston 11 is equipped with a gas inlet tube 15 whereat inert gas enters the piston to flow around and shield the cathode 14 as shown at 18. An anode supporting ring 20, which also serves as a coolant container, is disposed within the chamber 10 in proximity to the cathode 14 and with the axes of each coincidental. The supporting ring 20 has inlet and exhaust pipes 21 and 23, attached to the chamber walls through insulation 28, which pass the coolant to the passages 22 within the anode supporting ring 20. A graphite anode 19, having several holes 24 arranged around and parallel to its axis, is contained within the supporting ring 20. The hub of the anode 26, formed by the holes 24, actually serves as the arc contact point. A screw mechanism 13 on the piston rod facilitates striking of the arc between the anode and cathode by placing the cathode 14 very close to the anode 19 and slowly withdrawing it to the proper distance. Power is supplied to the anode 19 through the supporting member 20 and to the cathode 14 through the piston 11.

Gas is admitted to the chamber 10 through at least one inlet tube 32 disposed tangentially or radially in the chamber wall in a plane perpendicular to the axis of the chamber 10. The anode 19 is between the cathode 14 and the inlet tube 32. The chamber 10 has a convergent-divergent exhaust nozzle 12, in the end opposite the piston face 35, which leads into a wind tunnel 30 containing an article 34 to be tested. Generally the axes of the test article 34 and nozzle 12 are coincidental, but they need not necessarily be so.

Preferably, the anode 19 has a flat central hub 26 as shown in Fig. 3 but in some cases, it may be desirable to employ a raised central rod 27 as shown in Fig. 4. In either case, the anode performs the same function in much the same manner with the rod type anode increasing the life by about 25 percent. In order to protect the ring, it was found that several holes, preferably 4 to 6, drilled into a graphite cylinder, to form a central hub and spokes of graphite, resulted in complete control of electrode corrosion and extreme stability of the arc. The anode assembly as described herein utilizes a copper anode supporting ring which is fitted with a graphite insert acting as the anode. The anode, as described, has operated under very high power loads of the order of 95 kilowatts, and with high chamber pressures, ranging from 75 to 80 pounds per square inch gauge. Under these punishing conditions the anode ring showed no tendency to burn, and test runs for as long as 4 minutes at 60 kilowatts and 60 to 70 pounds per square inch have been made with this apparatus without damaging it. Under these conditions and using a nozzle having a ¼ inch diameter throat, a mass flow rate for air of 10 grams per second at a temperature of 3000° C. was obtained. The above mass flow rate is approximately equivalent to a velocity of about 1000 feet per second. When the apparatus is run at about 95 kilowatts and 75 to 80 pounds per square inch, velocities in the range of 5000 feet per second and temperatures of about 6000° C. result.

Contamination of gas heated by the above described apparatus has been limited to about 2 percent carbon dioxide, which is due primarily to the oxidation of the graphite anode. If it should be desirable to have a completely non-oxidizing gas, some inert gas, such as argon, helium or nitrogen, may be used as the gas to be heated.

Various modifications of this apparatus are possible so as to vary the resultant gas flow. Of course, the size of the chamber and arc-producing electrodes may be increased or decreased to suit the needs of the user and the power supply available. Similarly, the nozzle design and size may be changed by narrowing the neck of the nozzle or increasing or decreasing the angles of convergence and divergence in order to vary the flow characteristics and velocity of the gas.

Suitably, the cathode may be made of thoriated tungsten or graphite. If graphite is to be used, provision should be made for continuous feeding of it into juxtaposition with the anode, as this kind of cathode is consumed in generating the arc. It is desirable to use the thoriated tungsten cathode since it is not consumed in producing the arc.

What is claimed is:

1. An anode assembly comprising a coolant-containing supporting ring containing a carbonaceous member in the form of a hub with spokes extending from said hub to said supporting ring.

2. An anode assembly comprising a cooling-water-containing copper anode supporting ring having inlet and exhaust tubes extending therefrom and containing a graphite anode in the form of a hub with at least four spokes extending from said hub to said supporting ring.

3. A substantially cylindrical graphite element having holes therein parallel to and disposed around the center line thereof and having a flange at one end thereof, said element having the form of a hub with spokes radiating therefrom to a circumferential portion.

4. In an apparatus for producing very high velocity gas flow at elevated temperatures which comprises a chamber containing an electric arc producing device including an anode and a cathode; at least one inlet port for introducing fluid into said chamber to be heated by said arc; and at least one exhaust nozzle; the improvement comprising the provision of said anode in the form of a central hub having axially spaced spokes radiating therefrom which extend to an anode supporting ring, thereby forming passageways through said anode, said anode being spaced between the cathode of said arc producing device and said inlet port.

5. In an apparatus for producing very high velocity gas flow at elevated temperatures which comprises a chamber containing an electric arc producing device including an anode and a cathode, at least one inlet port, adapted to introduce fluid to be heated by said arc into said chamber; and at least one exhaust nozzle; the improvement comprising the provision of said anode in the form of a central hub having axially spaced spokes radiating therefrom extending to an anode supporting ring adapted to pass coolant therethrough which ring has inlet and exhaust tubes extending thereto through said chamber wall, said construction thereby forming passageways through said anode, said anode being spaced between the cathode of said arc producing device and said inlet port.

6. In an apparatus for producing very high velocity gas flow at elevated temperatures which comprises a chamber containing an electric arc producing device including an anode and a cathode; at least one inlet port, adapted to introduce fluid to be heated by said arc into said chamber; and at least one exhaust nozzle; the improvement comprising the provision of said anode in the form of a disk having a multiplicity of apertures therein the axes of which are substantially parallel to the axis of said disk but not coincident therewith, said anode being spaced between the cathode of said arc producing device and said inlet port.

7. In an apparatus for producing very high velocity gas flow at elevated temperatures which comprises a chamber containing an electric arc producing device including an anode and a cathode, at least one inlet port, adapted to introduce fluid to be heated by said arc into said chamber; and at least one exhaust nozzle; the improvement comprising the provision of said anode, in the form of a disk having a multiplicity of apertures therein the axes of which are substantially parallel to but not coincident with the axis of said disk, said disk being substantially perpendicular to the axis of the cathode of said arc producing device, and being spaced intermediately between said cathode and said inlet port.

8. In an apparatus for producing very high velocity gas flow at elevated temperatures which comprises a chamber containing an electric arc producing device including an anode and a cathode; at least one inlet port, adapted to introduce fluid to be heated by said arc into said chamber; and at least one exhaust nozzle; the improvement comprising the provision of said anode in the form of a central hub having axially spaced spokes extending therefrom to an anode supporting ring adapted to be water cooled having inlet and exhaust tubes extending therefrom to said chamber walls, said construction forming passageways through said anode, said anode being spaced intermediate the cathode of said arc producing device and said inlet port, said cathode being mounted on a screw fed piston, such that it may be brought into proximity with said hub, said cathode being fabricated of thoriated tungsten.

9. In an apparatus for producing very high velocity gas flow at elevated temperatures which comprises a chamber containing an electric arc producing device including an anode and a cathode; at least one inlet port, adapted to introduce fluid to be heated by said arc into said chamber; and at least one exhaust nozzle; the improvement comprising the provision of said anode in the form of a central hub having axially spaced spokes radiating therefrom thereby forming passageways through said anode, and an inert shielded screw-fed, piston-mounted thoriated tungsten cathode in proximity to said anode, said anode being spaced intermediate said cathode and said inlet port.

References Cited in the file of this patent

UNITED STATES PATENTS

| | | |
|---|---|---|
| 1,002,721 | Mathers | Sept. 5, 1911 |
| 2,806,124 | Gage | Sept. 10, 1957 |
| 2,819,423 | Clark | Jan. 7, 1958 |

OTHER REFERENCES

Scientific American, August 1957, pages 80–88, "The Plasma Jet," by G. Giannini.